June 21, 1955

S. RUBEN 2,711,496

LEAD PEROXIDE RECTIFIERS AND METHOD OF MAKING THE SAME

Filed Sept. 30, 1953

INVENTOR
Samuel Ruben
BY
ATTORNEY

United States Patent Office 2,711,496
Patented June 21, 1955

2,711,496

LEAD PEROXIDE RECTIFIERS AND METHOD OF MAKING THE SAME

Samuel Ruben, New Rochelle, N. Y.

Application September 30, 1953, Serial No. 383,185

14 Claims. (Cl. 317—238)

This invention relates to asymmetrically conductive devices suitable for use as alternating current rectifiers, specifically to a plate junction type rectifier employing an electrode of lead peroxide operating over its entire surface area, and to a method of producing such rectifiers.

The present application is a continuation in-part of my co-pending application Serial No. 311,947, filed September 27, 1952.

In my Patent No. 2,282,344 of May 12, 1942, I have disclosed an asymmetrically conductive junction comprising an electrode of lead peroxide in contact with anodized zinc, the device being particularly adaptable as a negative voltage resistance suitable in current control systems. The anodizing of the zinc is accomplished by immersing it in a weak alkaline solution and applying a positive potential.

In my Patent No. 1,678,824 of July 31, 1928, I have disclosed an electric current rectifier comprising anodized tantalum in contact with a metallic oxide, such as lead peroxide. The tantalum is oxidized by immersing it in a film forming solution, such as ammonium borate, and connecting it as the anode in a direct current circuit.

In its broadest aspects, the present invention is based on the discovery that the combination of an electrodeposited or electrolytically produced lead peroxide layer with an electrolytically oxidized or anodized titanium sheet provides a highly efficient rectifier of heretofore unobtainable characteristics. While I am aware of the fact that there were prior suggestions to use titanium oxide in a junction type rectifier, such structures involved the use of thick layers of titanium oxide, partially reduced from titanium dioxide either by hydrogen or steam to a conductive mixture of titanium oxides and the rectification has been dependent upon the asymmetric properties of this layer. In contrast to this, the operation of the junction type rectifier of my invention is inherently dependent upon the properties of a lead peroxide layer and on the novel cooperation of such layer with an anodized titanium surface, there being no rectification obtained when such anodized surface is combined with a metal counter electrode.

It is the general object of the invention to improve alternating current rectifiers.

It is an object of the present invention to provide a dry rectifier capable of operation over a very wide range of ambient temperature and particularly suitable for being operated by relatively high temperatures.

It is a further object of the present invention to provide a dry rectifier which can be directly produced as an integral junction by electrodeposition of its operating components.

It is also within the contemplation of the present invention to produce an integral dry rectifier junction by means of an electrochemical process, the rectifying characteristics of the junction being automatically determined by the nature of such process, without requiring any subsequent mechanical or thermal treatment after its electrochemical production to effect rectification.

The invention also contemplates a junction rectifier characterized by a high degree of uniformity between junctions and capable of being manufactured on a practical and industrial scale at a low cost.

Other and further objects and advantages of the present invention will become apparent from the following description, taken in conjunction with the accompanying drawing, in which.

Figure 1:
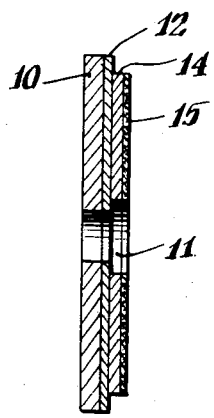
Figure 1 is a vertical sectional view of a rectifier junction embodying the principles of the invention.

In all of the figures, the thicknesses of the several layers and film have been greatly exaggerated for reasons of clarity.

Broadly stated, I have found that if titanium is anodized in a suitable electrolyte, an integral titanium oxide layer of micron thickness is produced thereon. If this anodized electrode is then made the anode in a solution of a suitable lead salt, and a potential applied, it becomes coated with a black, hard, integral layer of lead peroxide of good electrical conductivity. If contacts are made to the titanium and to the lead peroxide layer, respectively, rectification of alternating current will effectively take place.

In the manufacture of my novel rectifiers, the anodization of the titanium metal is one of the most important factors and is influenced by several variables, such as the composition of the electrolyte, temperature, applied voltage, current density and period of current application. While various electrolytes may be used, such as the alkali metal hydroxide solutions, borates, phosphoric acid or phosphates, nitrates, etc., I have found that the preferred electrolyte for producing the most conductive titanium oxide layer is a 50% solution of potassium hydroxide. The titanium metal which may be in disc, plate, or other suitable form, is made the anode in the potassium hydroxide solution having a temperature of 50° C., and a current is passed between said anode and an inert cathode, such as one of graphite. The initial anodizing current is adjusted to 100 milliamperes per square inch until the voltage drop between anode and cathode reaches 12 volts. Thereafter the voltage is maintained at 12 volts with a current which remains fairly constant at 30 milliamperes per square inch. A typical forming cycle for producing rectifier junctions of low forward voltage will appear from the following table:

| Minutes | 1 | 2 | 3 | 4 | 5 | 10 | 15 | 20 |
|---|---|---|---|---|---|---|---|---|
| Volts | 7.5 | 8.0 | 9.2 | 10.45 | 11.5 | 12 | 12 | 12 |
| Milliamperes/sq. in. | 100 | 100 | 100 | 100 | 42 | 30 | 30 | 30 |

Such forming cycle produces a uniform, dark blue, integral oxide of high electrical conductivity on the titanium anode, which in contact with an electrolytically produced lead peroxide layer will immediately rectify with a low forward voltage and low back leakage current. Such a lead peroxide layer is preferably produced by making the anodized titanium electrode the anode in a suitable lead salt solution and passing a current between such anode and a graphite cathode. While lead peroxide can anodically be deposited as a solid plate on an anodized titanium surface from such solutions as lead perchlorate, lead nitrate, lead sulfamate or lead acetate, I have found that lead acetate is the preferred electrolyte due to its pH and due to the fact that its pH varies but slightly during the deposition process. I have further found that mixtures of lead acetate with more conductive acetates are particularly suitable for the purposes of my invention. Examples of such more conductive acetates are the acetates of the alkali metals, including ammonium, such as sodium acetate, potassium acetate, lithium acetate and ammonium acetate, the potassium acetate being the preferred addition to lead acetate for improved deposition. While lead nitrate alone or mixed with sodium or potassium nitrates produces a relatively satisfactory deposition of lead peroxide, it is not as desirable as lead acetate, due to the substantial decrease in its pH during the deposition process and particularly as the result of its high nitric acid concentration at the anode, which to some degree may attack the anodized surface of the titanium anode.

The lead acetate electrolyte, when used alone, has a tendency to plate lead peroxide heavier on the edges and on the surface portions of the anode which are the closest to the cathode. By utilizing a more conductive acetate, such as potassium acetate, in combination with lead acetate in proportions, such as equal weights of potassium and lead acetates, to form a 40 grams per 100 milliliters of water solution, a very noticeable improvement is had. The plating is of uniform thickness all over the anodized titanium anode, the change in pH of the solution is negligible, a pH of 5.4 remaining constant throughout the plating operation, as compared to a change from 5.2 to 5.0 with an electrolyte of lead acetate only and from 3.2 to 1.5 with an electrolyte of lead nitrate. The plating constants are 0.5 mil thickness of deposit per square inch per ampere minute at 60° C. I have found that a plating thickness between 1 and 2 mils (0.001″–0.002″), is adequate for most applications. The plating with the mixed acetates described in the foregoing is in the form of a smooth, lustrous, black, solid deposit, which has the appearance of a black glaze and is characterized by high electrical conductivity.

The deposition voltage of the lead peroxide is preferably about 1 volt above the anodization voltage of the titanium electrode. Thus, for most practical applications, the preferred anodization voltage is 12 volts and the lead peroxide deposition voltage is 13 volts. The current density of deposition of the lead peroxide affects the smoothness and denseness of the deposit and for smoothest and densest deposits, a current density of 25 milliamperes per square inch anode surface is preferable. The preferred plating temperature, which also to some extent influences the density of the deposit, is 60° C. To eliminate any occluded gas bubbles, it is desirable to apply mechanical vibrations to the anode, which promote diffusion of the electrolyte at the anode and release any gas bubbles that may be present.

It is to be noted that the electrolytically produced or electrodeposited lead peroxide electrode of the present invention provides important advantages over electrodes made from chemically produced lead peroxide. The resistivity of electrolytically produced lead peroxide is a mere fraction, $1 \times 10^{-4}$ ohm/cm., of that of the chemically produced lead peroxide, which is $142 \times 10^{-4}$ ohm/cm. for chemically pure $PbO_2$ compressed at a pressure of 10 tons per square inch. This is probably due to the molecular structure of the electrolytically formed lead peroxide, which involves oxygen in less than stoichiometric proportions with an excess of Pb, such as $PbO_{1.991}$, providing a source of free electrons and accounting for the excellent electronic conductivity with metal-like conduction characteristics. Furthermore, chemically produced lead peroxide tends to react with the titanium oxide surface with evidence of reduction of the lead peroxide to lead oxide, particularly when operating at higher temperatures, which materially and adversely affects the internal resistance and useful life of the rectifier.

Although completely satisfactory rectifiers can be made by the above-described procedure of direct anodic deposition of the lead peroxide from a suitable lead salt solution upon the anodized titanium electrode, I have found that the rectifying junctions of the invention are further improved, more particularly they age up quicker and have a lower initial leakage loop on alternating current applications if an extremely thin mechanically immeasurable film of a suitable water-repellent material is applied to the anodized titanium surface prior to deposition of the lead peroxide layer thereon. Silicone films are particularly advantageous for the purpose, such as one made by preparing a 0.5% solution of a suitable silicone in naphtha, which is wiped on or is otherwise applied to the anodized surface. The residue film is allowed to dry and the anodized and coated titanium electrode is then subjected to electrodeposition of the lead peroxide layer thereon. The said film does not have any observable effect on the conductivity of the anodized surface and shows only the characteristic of being unwettable. The use of a silicone film appears to be desirable as it withstands high temperatures and does not carbonize when the junction is operated at relatively high temperatures, as do most organic lacquers, with resultant adverse effect on the leakage current of the junction. It allows the immediate application of a higher A. C. operating voltage to the junction, such as 18 volts R. M. S., without any scintillation or sparking and without requiring an aging period of a lower starting voltage, such as 14 volts, which is then subsequently raised to the full operating voltage.

The function of my water repellent film is believed to be fundamentally different from that of conventional barrier layers, the provision of which is common practice in selenium rectifiers in order to enable them to handle higher applied voltages. It appears to be probable that my water-repellent film fills in the submicroscopic discontinuities of the anodized titanium surface so that electrodeposition of the lead peroxide will proceed in the absence of any projections or stringers extending through the grain boundaries of the titanium oxide layer which had to be inactivated by the aging process. The thickness of my water-repellent film cannot be measured by mechanical means and, apart from the said discontinuities of the anodized titanium surface, does not appear to cover the said surface itself as indicated by the fact that the said film does not increase the forward resistance of the rectifier junction.

In order that those skilled in the art may have a better understanding of the invention, the following illustrative example of the preparation of a rectifier junction may be given.

*Example*

1. The titanium sheet, having a thickness of about 10 mills, is cleaned with a suitable detergent to release any surface grease. It is washed and air-dried, then etched for 20 hours at room temperature in a 20% solution of hydrochloric acid, which removes any trace of iron that may have been present as a result of abrasion during the rolling process. Finally, the etched sheet is washed and air blast dried. The treatment of the titanium prior to anodization is of considerable importance in producing a uniform anodized layer of low electrical resistance.

2. The cleaned titanium sheet is anodized in a 50% solution of potassium hydroxide at 50° C., with an initial current of 100 milliamperes per square inch until the voltage across it reaches 12 volts and for a total elapsed time of 20 minutes. It is washed in water and air blast dried. Where the structure involves areas, such as the edges or back of plates, on which no lead peroxide layer is desired, such areas are coated with a layer of an insulating lacquer.

3. A very thin wiped on film of silicone compound is applied over the active anodized area and dried.

4. The electrode thus prepared is placed as the anode in the preferred electrolyte comprising equal parts by weight of lead acetate and potassium acetate at 60° C. and a layer of lead peroxide is electrodeposited thereon at a current density of 25 milliamperes per square inch at 13 volts, for a period of 20 minutes.

5. The junction is washed with warm, distilled water and dried. It is now ready for assembly into stacks and is aged at 17 volts per junction at about 100 milliamperes per square inch for a few hours. Contact with this integral rectifier junction may be made in a conventional manner, such as by spraying a coating of a suitable alloy, for example, a mismuth-tin alloy, on the lead peroxide layer, or by direct metal contact to the peroxide layer, the other terminal of the junction being constituted by an uncoated, anodized surface portion of the titanium electrode, or to the titanium base directly. The junction may then be used for rectifying alternating currents, or as an asymmetrical conductor in a direct current circuit. A typical unit made by the above process is capable of being operated at a voltage of about 17 volts per junction.

The particular titanium oxide formed on the titanium by anodization is of critical importance in obtaining the new results and advantages of the present invention. If the said oxide contains a high percentage of $TiO_2$, an insulative layer including only limited conductive areas is produced, allowing only point contact rectification, such being the case with the heat-produced, hydrogen- or steam-reduced oxide layers of the prior art or when the anodization is carried out with highly oxidizing electrolytes. To obtain the highly conductive titanium oxide of the present invention, a layer mainly composed of TiO must be produced, or one that contains oxygen in less than the stoichiometric proportions necessary for forming $TiO_2$, such as, for example, $TiO_{1.95}$ or $Ti_2O_3$.

The titanium oxide layer produced in accordance with the present invention, the thickness of which is mechanically immeasurable, is characterized by a dark blue surface color and is highly conductive. In combination with a layer of electrolytically formed lead peroxide, it is capable of providing an efficient, highly stable, wide area junction of low resistance. In contrast to this, the titanium oxide layers of the prior art, formed by heat treatments, possibly including partial reduction of $TiO_2$ with hydrogen or steam, are characterized by layers of mechanically measurable thicknesses of white, yellowish-green, or grey color, and form only relatively unstable, limited area junctions of high resistance.

The drawing illustrates certain preferred forms of the rectifiers of the invention.

Referring now more particularly to Figure 1 of the drawing, reference numeral 10 denotes a plate or disc of titanium metal having a mounting hole 11 extending through the center portion thereof. Upon this base, there is formed an anodized layer 12 of a suitable oxide of titanium. An electrodeposited layer 14 of lead peroxide is in contact with the anodized layer 12, excepting the circumferential, marginal portions of layer 12. This may be accomplished by masking such portions with an insulating lacquer (not shown) prior to the electrodeposition of the lead peroxide, as those skilled in the art will readily understand. A thin contact layer 15 of bismuth-tin, or of some other suitable alloy, is sprayed on the exposed surface of the lead peroxide layer 14, in order to provide low resistance electrical contact with the lead peroxide layer. A plurality of such single junctions may be connected in series, or in other circuit combination in a manner well-known in the rectifier art.

Figure 2:
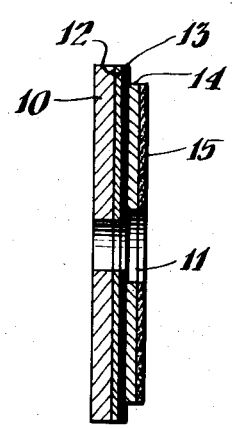
Figure 2 is a similar view of a modified embodiment of the invention.

Figure 2 illustrates a modified embodiment of the present invention which is closely similar to the one shown in Figure 1, similar reference numerals having been used to denote corresponding parts. The difference between the two structures resides in the provision of an extremely thin film 13 of a water-repellent compound, such as a suitable silicone solution, between the anodized layer 12 and the lead peroxide layer 14. While in the drawing, this film has been shown as covering the titanium oxide layer 11 in its entirety, actually the said film is sufficiently thin as to merely fill in the submicroscopic discontinuities of the surface of said layer without covering the remainder of said surface.

Figure 3:
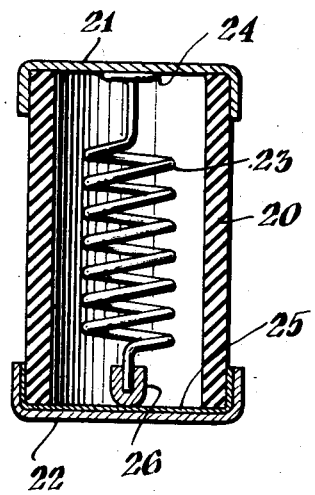
Figure 3 is a longitudinal sectional view of a further embodiment of the invention in the form of a sealed rectifier diode.

Figure 3 shows a diode rectifier of small dimensions comprising a tube 20 of an insulating plastic and closed at its ends by metal caps 21 and 22 forcefitted thereon. Cap 21 is formed of nickel-plated steel having one end of a steel spring 23 spot-welded to the inner surface thereof, as indicated at 24. Cap 22 is formed of titanium and is provided with an anodized layer 25 on its inner surface. The center portion of this anodized layer is in pressure contact with a dense layer 26 of lead peroxide electrodeposited or otherwise provided on the free end of spring 23, thereby providing a contact rectifier. The contact pressure provided by the tension of the spring is sufficiently high as to eliminate the need for any other support. A diode of the described character is particularly suitable for low current applications in electronic and radio circuits, computers, and the like.

Although the present invention has been disclosed in connection with a few preferred embodiments thereof, variations and modifications may be resorted to by those skilled in the art without departing from the principles of the invention. I consider all of these variations and modifications to be within the true spirit and scope of my invention, as disclosed in the aforegoing description and defined by the appended claims.

I claim:

1. An asymmetrically conductive junction comprising electrolytically produced lead peroxide in contact with a cooperating electrode comprising titanium.

2. An asymmetrically conductive junction comprising a titanium plate having an anodized surface, and a layer of electrolytically produced lead peroxide in contact therewith.

3. An asymmetrically conductive junction comprising an anodized titanium base in contact with an electrolytically deposited lead peroxide layer.

4. An asymmetrically conductive junction comprising a plate of titanium having an electrolytically formed oxide layer thereon, and a layer of lead peroxide electrodeposited on said oxide layer.

5. An asymmetrically conductive junction comprising a plate of titanium having an electrolytically formed oxide layer of micron thickness thereon, and a dense and continuous layer of lead peroxide electrodeposited on said oxide layer.

6. An asymmetrically conductive junction comprising a plate of titanium having an electrolytically formed oxide layer thereon, and a dense and continuous layer of lead peroxide having a thickness between 0.001" and 0.002" electrodeposited on said oxide layer.

7. An asymmetrically conductive junction comprising a plate of titanium having an electrolytically formed oxide layer thereon, and a layer of lead peroxide in contact with said oxide layer, said peroxide layer having such characteristics, including high electrical conductivity, as are obtained by electrodeposition thereof from the aqueous solution of a lead salt.

8. An asymmetrically conductive junction comprising a plate of titanium having an electrolytically formed oxide layer thereon, a layer of lead peroxide electrodeposited on said oxide layer, and a metal layer in contact with said peroxide layer and constituting one of the terminals of the junction.

9. An asymmetrically conductive junction comprising a base of titanium having an electrolytically formed conductive oxide layer thereon, said oxide layer being characterized by a dark blue color and by the presence of oxygen in less than stoichiometric proportions and insufficient to form $TiO_2$, and a layer of electrolytically produced lead peroxide on said oxide layer.

10. An asymmetrically conductive junction comprising a titanium plate having an anodized surface, a water-repellent film on said surface, and a layer of electrolytically produced lead peroxide on said water-repellent film.

11. An asymmetrically conductive junction comprising a titanium base having an anodized surface, a water-repellent film on said surface, and a layer of lead peroxide electrodeposited on said film, said film being sufficiently thin to have no appreciable effect on the internal resistance of the junction.

12. An asymmetrically conductive junction comprising a titanium base having an anodized surface, a film of silicone compound on said surface, and lead peroxide electrodeposited on said film, said silicone film being sufficiently thin to have no appreciable effect on the internal resistance of the junction.

13. A rectifier comprising an insulative tube, a metal cap secured to each end of said tube, one of said caps being formed of titanium and having an anodized inner surface, the other cap having one end of a spring member connected thereto, and a layer of electrolytical lead peroxide on the other end of said member and in pressure contact with said anodized surface.

14. A rectifier diode comprising an insulative tube, a titanium cap having an anodized inner surface on one end of said tube, a metal cap on the other end of said tube, a spring member having one of its ends secured to said metal cap, and a layer of lead peroxide electrodeposited on the other end of said member and in pressure contact with the anodized surface of the titanium cap, said caps constituting the terminals of the rectifier and defining with said tube a sealed enclosure.

References Cited in the file of this patent

UNITED STATES PATENTS

| | | |
|---|---|---|
| 1,678,824 | Ruben | July 31, 1928 |
| 1,911,604 | Calbeck | May 30, 1933 |
| 2,282,344 | Ruben | May 12, 1942 |